Patented Jan. 5, 1926.

1,568,728

UNITED STATES PATENT OFFICE.

GEORGE C. FREEMAN, OF PHILADELPHIA, PENNSYLVANIA, ASSIGNOR TO ANTISCALE CORPORATION, OF PHILADELPHIA, PENNSYLVANIA, A CORPORATION OF DELAWARE.

PROCESS FOR PROTECTION OF METALLIC SURFACES.

No Drawing. Application filed April 13, 1925. Serial No. 22,879.

*To all whom it may concern:*

Be it known that I, GEORGE C. FREEMAN, a citizen of the United States, and resident of Philadelphia, in the county of Philadelphia and State of Pennsylvania, have invented new and useful Improvements in Processes for Protection of Metallic Surfaces, of which the following is a specification.

My invention relates to a method of preventing or eliminating the scaling or encrusting of metal in contact with fluid, a special and important embodiment and application of my invention being a method whereby containers or conduits such as boilers, evaporators, economizers, condensers, cold and hot water pipes and the like are protected against the formation of scale from sediment or precipitates in the fluid therein contained and being processed.

The fact that scale or encrustation forms upon metallic surfaces that are in contact with fluid, particularly when the fluid is undergoing a change of character or temperature is well known and the fact that under such condition electrolytic corrosion of the metal takes place is also well known, such corrosion being hereinafter referred to as normal or natural electrolytic corrosion, an example thereof being the rusting or pitting of a steam boiler.

It has heretofore been proposed to protect a metallic surface that is in contact with a fluid against the formation of scale or encrustation by passing an electric current through the metallic body of which the surface is to be protected, or by introducing the current to the metallic body and withdrawing it from the fluid or vice versa. And, it has been proposed heretofore to employ electric current of low voltage. In the practice of my invention I prefer to introduce an electric current to and withdraw it from the metallic body of which the surface is to be protected without directly introducing the current to or withdrawing it from the liquid that is in contact with that surface. In order to effect the prevention and elimination of the formation and adhesion of scale and encrustation upon the surface of the metallic body that is in contact with a fluid the voltage of the current that is passed through the metallic body and the amount of current flowing through the metallic body are carefully regulated. The voltage of that current is so regulated that the natural or normal electrolytic corrosion of that surface will not be appreciably augmented or accelerated, and the current is so regulated that scaling and encrustation of the surface to be protected are prevented and eliminated. To this end the terminals of a source of electric current are connected to remote points of the metallic body of which the surface is to be protected against the formation and adhesion of scale and encrustation. The potential difference between the points at which the source is so connected is so regulated that the potential gradient, i. e., the ratio of the total potential difference between the points at which the source is connected to the distance between those points, will be low enough that the natural or normal electrolytic corrosion of the surface will not be thereby appreciably accelerated or augmented. If the surface to be protected is of such form that points widely spaced along that surface are nevertheless in such proximity that current might flow through the fluid between those two points, the points of the surface which are to be connected with the terminals of the source of current are so selected as to avoid such straying or diversion of the current through the fluid. The value of the potential gradient that may be maintained along the extent of the body of which the surface is to be protected will vary with the conditions to which that surface is subjected. The conductivity of the fluid in contact with the surface to be protected, the character of that fluid, for example, the chemical activity thereof with respect to the surface to be protected, the temperature of the surface to be protected, and the proximity or portions of the surface are conditions that may control the value of the potential gradient that must be employed and the points at which the source of current is to be connected thereto. In determining the proper potential gradient to be used, under the particular conditions surrounding the surface to be protected, and the points at which the source of electric current is to be connected to that surface, the controlling factor is that the normal or natural electrolytic corrosion shall not be appreciably augmented or accelerated beyond that which would take place if no electric current from an external source were passed through the body of which the surface is to be protected. The potential gradient having been ascertained the amount of current passing through the metallic body of which the surface is to be protected is to be brought to such value that formation and adhesion of scale or encrustation will ordinarily be prevented and in most cases previously formed scale will be removed. The amount of current flowing through the body of which the surface is to be protected is not to be determined by a measurement of only the amount of current flowing but is to be determined by ratio of that current to the cross-sectional area of the metallic body of which the surface is to be protected. In other words it is the cross-sectional density of the current that is the measure by which the amount of current is to be regulated. If it be found that with a given potential gradient a certain amount of current will protect the surface of a given metallic body the current necessary to protect the surface of another metallic body of a similar metal under the same conditions must be such that the cross-sectional density of the current is substantially the same in both bodies.

I have found that certain metallic bodies of which the surface is to be protected, for example, a steam boiler, have a current flowing through them, which will be referred to herein as the inherent current of the body, and which may result from a thermo-electric, or thermo-couple effect, in the metallic body itself, by reason of variations in the temperature and chemical composition throughout the metallic body, or from galvanic action due to contact of the metal with liquid, or from some other cause. I have found that the flow in a metallic body of which the surface is to be protected of sufficient current to produce a cross-sectional density of current great enough to protect that surface, will be enhanced if the current produced by an external source between the points at which the terminals of that source are connected, flows in the same direction as the inherent current of the metallic body. In accordance with my invention the direction of flow is determined of such inherent current, if any, between the points at which the terminals of the external source of current are connected; and the external source of current is then so connected to those points that the current thereby produced in the metallic body will flow in the metallic body in the same direction as the inherent current. By causing the current produced in the body by the external source of current to flow in the same direction as the inherent current it is possible to produce within the metallic body a sufficiently high cross-sectional density of current to prevent the formation and adhesion of scale and encrustation while maintaining the potential gradient of the current so low that it will not appreciably accelerate or augment the natural or normal electrolytic corrosion of the body.

From the foregoing a determination may readily be made of the potential gradient that may safely be employed without accelerating or augmenting the natural or normal electrolytic corrosion of the surface to be protected, and also of the value of the cross-sectional density of the current that must be employed in order to protect that surface against the formation and adhesion of scale and encrustation, and also of the direction in which current from an external source must be caused to flow within the body of which the surface is to be protected in order that a sufficient cross-sectional density of current may be produced without the employment of a potential gradient that will accelerate or augment the natural or normal corrosion of the surface to be protected. As an example I have found that the protection of a steam boiler of the usual boiler steel and containing water of ordinary hardness, may be accomplished if the potential gradient is equal to, or less than, one milli-volt per linear foot of the boiler and the cross-sectional density of the current is equal to or greater than one third of a milli-ampere per square inch of the cross-section of the metal of the boiler, provided the external source of current is connected to the boiler, in accordance with my invention, so that the inherent current of the boiler and the current supplied from the external source flow in the same direction. The thermo-couple is a convenient and desirable source of electric current for use in the practice of my invention. In the example above referred to remotely spaced points on the boiler, namely at the ends, were so selected that by connecting the terminals of a thermo-couple to those points there would be a substantially uniform flow of current throughout all parts of the metallic boiler shell and by connecting the lead wires of a volt meter to those points a deflection of the indicating needle of the volt meter indicated that there was an inherent flow of current in the boiler shell between those points due possibly to thermo-electric action within the boiler or to differences in the material of different parts of the boiler or to galvanic action within the boiler or to other causes. The junction of the thermo-couple was fastened in close contact with a heated portion of the boiler, namely the main steam pipe, and the terminals of the thermo-couple were connected to the selected points on the boiler and the current flowing in the wires leading to the boiler was measured. The connections between the terminals of the thermo-couple and the selected points on the boiler were reversed and the current in the wires leading from the thermo-couple was again measured. By finally leaving the terminals of the thermo-couple connected in the manner that caused the greatest flow of current I was assured that the current flowing in the boiler shell from the thermo-couple was flowing in the same direction as the inherent current of the boiler of which the existence was indicated by the fact that the needle of a volt meter connected between those points was deflected.

What I claim and desire to secure by Letters Patent of the United States is:

1. The process of protecting a fluid-contacting surface of a metallic body against encrustation or scaling which comprises so connecting the terminals of a source of electric current to spaced points of said body that current is caused by said source of current to flow in said body in the same direction as the inherent current in said body.

2. The process of protecting a fluid-contacting surface of a metallic body against encrustation or scaling which comprises connecting the terminals of a source of electric current to spaced points of said body and thereby completing an electric circuit including a part of said body, and so regulating the direction of current flowing from said source that current from said source produces in said body between said points a flow of current in the same direction as the inherent current in said body.

3. The process of protecting a fluid-contacting surface of a metallic body against encrustation or scaling which comprises causing electric current from an external source to flow through said body in the same direction as the inherent current in said body.

4. The process of protecting a fluid-contacting surface of a metallic body against encrustation or scaling which comprises connecting the terminals of a source of electric current to spaced points of said body and thereby completing an electric circuit including a part of said body, and so regulating the direction of current flowing from said source that current from said source produces in said body between said points a flow of current in the same direction as the inherent current in said body, while maintaining the potential gradient between said points below that which will accelerate normal electrolytic corrosion of the surface.

5. The process of protecting a fluid-contacting surface of a metallic body against encrustation or scaling which comprises causing electric current from an external source to flow through said body in the same direction as the inherent current in said body, while maintaining the potential gradient between said points below that which will accelerate normal electrolytic corrosion of the surface.

In testimony whereof, I have signed my name to this specification.

GEORGE C. FREEMAN.